United States Patent [19]

Susie

[11] 4,168,502

[45] Sep. 18, 1979

[54] DIGITALLY CONTROLLED SIGNAL SIMULATOR

[75] Inventor: William F. Susie, Cockeysville, Md.

[73] Assignee: Westinghouse Electric Corp., Pittsburgh, Pa.

[21] Appl. No.: 886,973

[22] Filed: Mar. 15, 1978

[51] Int. Cl.² .............................................. G01S 7/40
[52] U.S. Cl. ................................................. 343/17.7
[58] Field of Search ..................................... 343/17.7

[56] References Cited

U.S. PATENT DOCUMENTS

| 3,323,123 | 5/1967 | Hegarty et al. | 343/17.7 |
| 3,903,521 | 9/1975 | Jensen et al. | 343/17.7 |

*Primary Examiner*—T. H. Tubbesing
*Attorney, Agent, or Firm*—J. B. Hinson

[57] ABSTRACT

A signal simulator for generating a simulated target signal useful in testing the receiver and data processing portions of radar systems is disclosed. Input signals to the signal simulator include a multi-pulsed synchronizing signal having substantially the same duty cycle and PRF (pulse repetition frequency) as the RF output signal of the radar transmitter normally used in conjunction with the receiver, digital signals specifying the acceleration, the initial velocity and the initial range of the target to be simulated. A target range calculator circuit utilizes the acceleration, initial velocity and initial range signals to calculate the range of a simulated target. A plurality of delay circuits are sequentially initialized by the synchronizing signal to generate a trigger signal delayed from the synchronizing signal with the delay corresponding to the range of the simulated target. The pulse width of each pulse of the synchronizing signal is measured and stored. A pulse generator circuit in response to the trigger signal reads the stored values corresponding to the width of the pulses of the synchronizing signal and generates a delayed synchronizing signal having the same PRF and duty cycle as the synchronizing signal with the delay corresponding to the range of the simulated target. The target range calculator also generates a signal which determines the amplitude and a signal which determines the frequency of the simulated target signal. These signals are coupled as input signals to a signal synthesizer. The output signal of the synthesizer and the delayed synchronizing signal are coupled to a signal generator to generate the simulated target signal.

7 Claims, 3 Drawing Figures

DIGITALLY CONTROLLED SIGNAL SIMULATOR

STATEMENT OF GOVERNMENT INTEREST

The invention was first conceived or reduced to practice under Contract F-33657-75-C-0310 with the U.S. Air Force.

BACKGROUND OF THE INVENTION

1. Field of the Invention

The invention relates to signal simulators and more specifically to a signal simulator for simulating the target return signal of a radar system.

2. Description of the Prior Art

Typical prior art target signal simulators have been either extremely complicated in that they were controlled by a digital computer or limited to producing signals useful in testing short range or low PRF radar systems. The computer based systems were complicated due to the extensive programming required to generate the delays corresponding to the range of the simulated target and to calculate the pulse repetition frequency of the simulated target signal. The limited range of the simulators which did not use digital computers primarily resulted from the fact that they provided no convenient means for generating a simulated target signal in which the time interval between adjacent pulses of the signal was less than the transit time to and from the simulated target. These problems are substantially overcome by the system which is the subject of this invention.

SUMMARY OF THE INVENTION

The target signal simulator which is the subject of this application includes means for accepting a synchronizing signal having a PRF and duty cycle substantially equal to the PRF and duty cycle of the transmitter utilized by the radar system to be tested. The target signal simulator also includes a target range calculator which accepts as inputs signals specifying the acceleration, initial velocity and initial range of a simulated target and generates as an output a delay select signal. (The term "simulated target" is used to designate an imaginary target which would reflect a radar signal to generate a return signal having the characteristics of the simulated target signal which is generated at the output of the disclosed target signal simulator.) Each pulse of the synchronizing signal is detected and utilized to preset a delay circuit to generate a sequence of pulses with each pulse defining the expiration of a delay interval corresponding to a pulse of the synchronizing signal, each delay interval being determined by the value of the delay select signal at the time the associated pulse of the synchronizing signal was detected. This sequence of pulses comprises a trigger signal delayed from the synchronizing signal by a time interval corresponding to the range of the simulated target. Additionally, the range target calculator generates a doppler signal to control the frequency of the simulated target signal and an amplitude signal to control the amplitude of the simulated target signal in accordance with the range of the simulated target.

Each pulse of the synchronizing signal also initiates a pulse width measuring circuit. This circuit measures the width of each individual pulse of the synchronizing signal and stores a digital number indicative of the measured width. The stored digital numbers are read and combined with the trigger signal to generate a delayed synchronizing signal having the same PRF and duty cycle as the synchronizing signal. A signal synthesizer receives the amplitude and doppler select signals from the target range calculator and in response thereto generates an RF signal having a selected amplitude and frequency. The output of the signal of the signal synthesizer and the delayed synchronizing signal are coupled as inputs to a signal generator to generate at the output thereof the simulated target signal.

DETAILED DESCRIPTION OF THE PREFERRED EMBODIMENT

Figure 1:
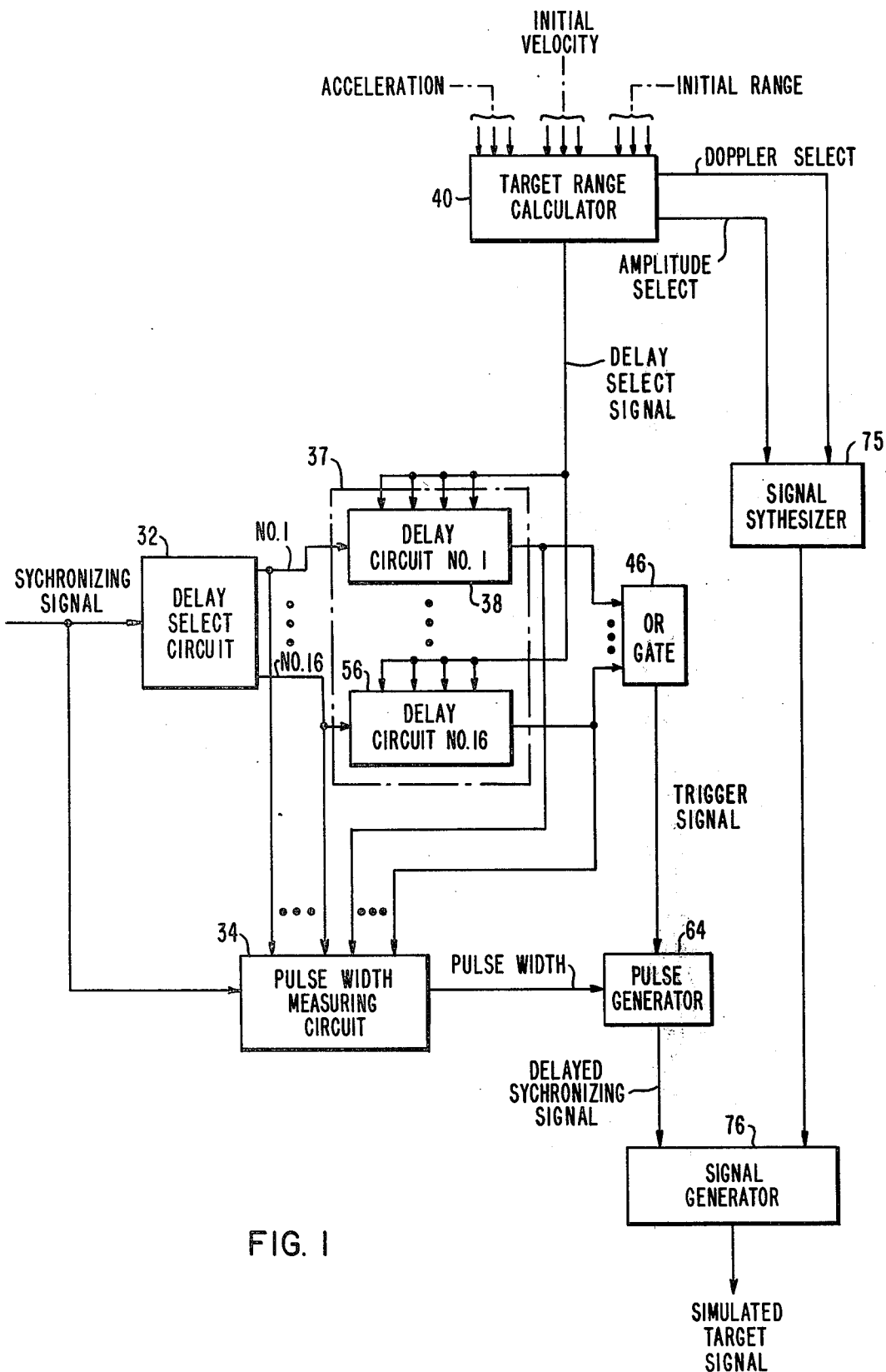
FIG. 1 is a functional block diagram of the target signal simulator.
Figure 2:
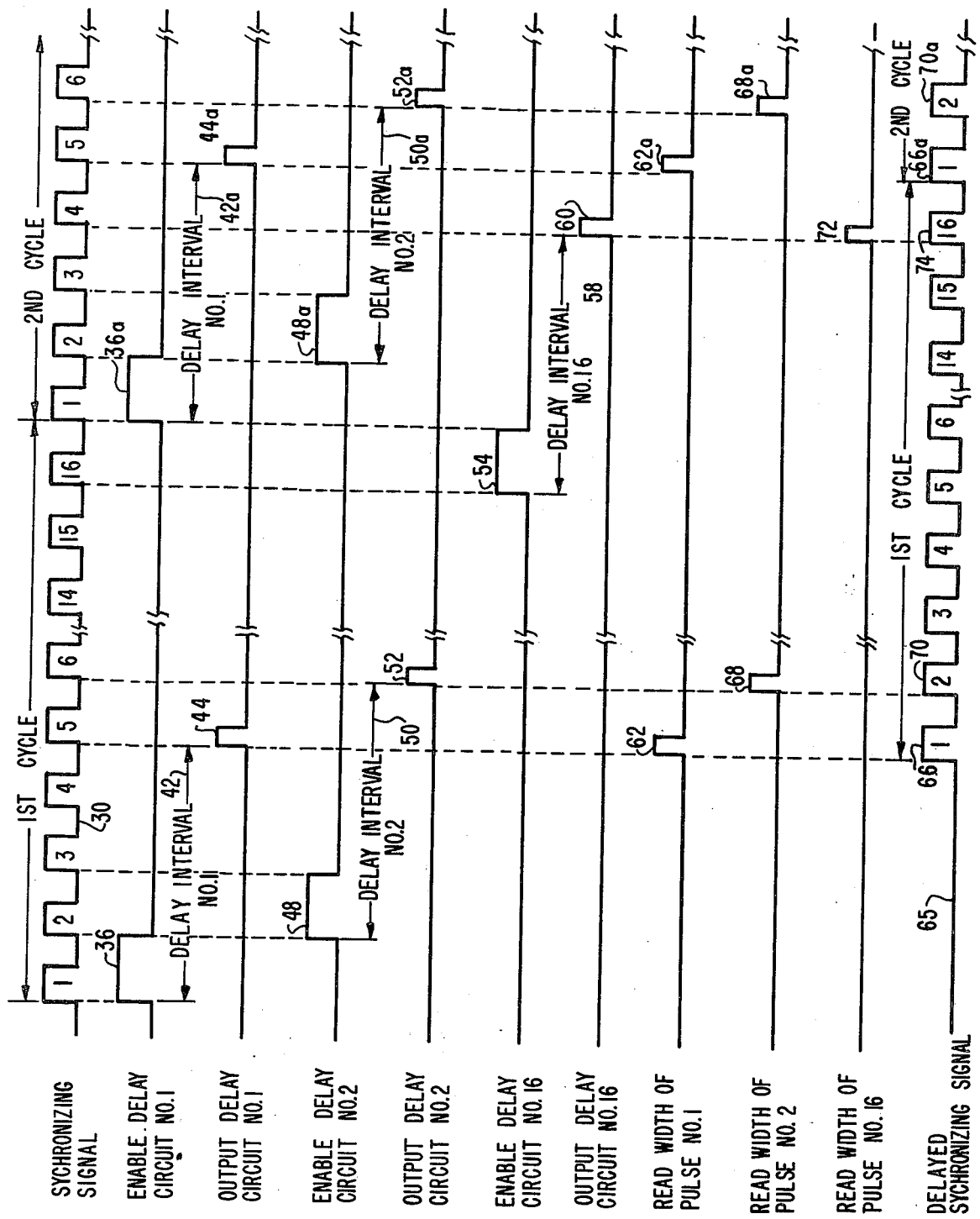
FIG. 2 is a waveform diagram illustrating the major timing signals utilized by the target signal simulator.

FIG. 1 is a functional block diagram of the target signal simulator. The operation of the target signal simulator will be explained utilizing the block diagram (FIG. 1) and the waveform diagram (FIG. 2).

A multipulse synchronizing signal 30 is coupled as an input to the target signal simulator. This signal is supplied by the radar system to be tested and is synchronized in PRF and duty cycle with the pulses of RF energy normally transmitted by the radar transmitter. Although the synchronizing signal 30 is illustrated as a square wave, this signal normally has a duty cycle in the range of 100:1. The square wave was chosen as a convenient way to illustrate this signal because changing the duty cycle does not change the operation of the target signal simulator functions. This is true because the target signal simulator automatically tracks the duty cycle and PRF of the synchronizing signal 30.

For convenience each sixteen adjacent pulses of the synchronizing signal are referred to as a cycle. For example, in FIG. 2, two typical cycles of the synchronizing signal 30 are illustrated and arbitrarily labeled "1st cycle" and "2nd cycle." For convenience of discussion, the pulses of the multipulse synchronizing signal 30 labeled 1st cycle have been further identified by sequential numbers ranging from one to sixteen with these numbers being repeated for the 2nd cycle.

The multipulse synchronizing signal 30 is coupled as an input to a delay select circuit 32 and to a pulse width measuring circuit 34. Delay select circuit 32 is preferably a 4 bit digital counter which is stepped to generate sixteen digital numbers (0000 to 1111) which are decoded to generate 16 sequential but non-overlapping digital output signals. When the digital counter reaches a count of fifteen (1111) it is reset to zero (0000) and the cycle is repeated for subsequent cycles of the synchronizing signal 30.

The sixteen output signals of delay circuit 32 sequentially initiate sixteen delay circuits, (collectively illustrated at reference numeral 37). For example, the first pulse of the 1st cycle of the synchronizing signal 30 is detected and decoded by the delay select circuit 32 to generate a pulse 36 which initiates delay circuit No. 1 (identified by the reference numeral 38).

Signals specifying the acceleration, initial velocity and initial range of the target to be simulated are coupled as inputs to a target range calculator 40. In response to these signals the target range calculator 40 generates a delay select signal which is coupled to the delay circuits No. 1 through No. 16. Initialization of delay circuit No. 1, by pulse 36 presets delay circuit No. 1 to generate delay interval No. 1 (illustrated at reference numeral 42) with the duration of this interval being determined by the delay select signal. After delay interval No. 1 has expired, pulse delay circuit No. 1 will generate an output pulse 44 which is coupled to one input of an OR gate 46.

The second pulse of the multipulse synchronizing signal 30 is detected by the delay select circuit 32 causing pulse 36 to terminate and generating a second pulse 48 which initializes pulse delay circuit No. 2 (not illustrated). Initializing pulse delay circuit No. 2 presets the second delay circuit to generate delay interval No. 2 (illustrated at reference numeral 50. At the expiration of delay interval No. 2, the second delay circuit generates an output pulse 52 which is also coupled to the input of OR gate 46. This same sequence of operation is repeated for delay circuits No. 1 through No. 15.

When the sixteenth pulse of the first cycle of the multipulse synchronizing signal 30 is detected, delay select circuit 32 generates a pulse 54 which initializes delay circuit No. 16 (illustrated at reference numeral 56). Initialization of delay circuit 16 presets this circuit to generate delay interval No. 16 (illustrated at reference numeral 58). When the time interval corresponding to delay interval No. 16 expires, delay circuit 16 generates an output pulse 60 which is also coupled to the input of OR gate 46. Detection of the sixteenth pulse of the synchronizing signal 30 also resets the delay select circuit 32 causing the above sequence to be repeated for the second and subsequent cycles of the synchronizing signal 30.

The delay circuits No. 1 through No. 16 may be preset down counters with the output of the counters decoded to generate a pulse when a count of zero is reached. These functions can be implemented using commercially available circuits.

As previously explained, the synchronizing signal 30 is also coupled to the input of a pulse width measuring circuit 34. Pulse width measuring circuit 34 also receives the output signals of the delay select circuit 32. For example, during the duration of the first pulse of the first cycle of the synchronizing signal 30, a counter which is part of the pulsewidth measuring circuit 34 is enabled to count high frequency clock pulses to generate a digital number specifying the duration (width) of the first pulse of the 1st cycle of the synchronizing signal 30. During the time interval between the trailing edge of the first pulse of the 1st cycle of the synchronizing signal 30, and the rising edge of the second pulse of the 1st cycle of this signal, the digital number stored in this counter is transferred to a memory. Detection of the rising edge of the second pulse of the 1st cycle of the synchronizing signal 30 causes this counter to be reset and start counting again with the digital number in the counter being stored in the memory between the trailing edge of this pulse and the leading edge of the third pulse of the 1st cycle of this signal. This procedure is repeated sequentially for all 16 pulses comprising the 1st cycle of the synchronizing signal 30. This requires that the memory have at least sixteen separate storage locations. After the 1st first cycle of the synchronizing signal 30 is completed, the same sequence of pulse width measurement and storage cycles is repeated for the 2nd and subsequent cycles of the synchronizing signal 30.

After delay interval No. 1 (identified by reference numeral 42) expires, a pulse 62 indicating that the digital number specifying the width of the first pulse of the 1st cycle of the synchronizing signal 30 should be read from the memory, is generated by delay circuit No. 1 and coupled to the pulse width measuring circuit 34. This causes the digital number identifying the width of the first pulse of the 1st cycle of the synchronizing signal 30 to be read and coupled to pulse generator 64. This digital number in conjunction with the output pulse 44 of the first delay circuit 38, which is coupled through OR gate 46, enables the pulse generator 64 to generate at the output thereof a pulse 66 having the same width as the first pulse of the synchronizing signal 30 and delayed therefrom by delay interval No. 1. Similarly, after the expiration of delay interval No. 2 (identified by reference numeral 50) a pulse 68 specifying that the number specifying the width of the second pulse of the 1st cycle of the synchronizing signal 30 be read from the memory is generated by delay circuit No. 2. This pulse is coupled to pulse width measuring circuit 34 causing the desired digital number to be read from the memory and coupled to the pulse generator 64. The pulse generator circuit 64 utilizes the digital number specifying the width of the second pulse of the 1st cycle of the synchronizing signal 30 in conjunction with the output pulse 52 of delay circuit No. 2 to generate a second pulse 70 having a width identical to the width of the second pulse of the 1st cycle of the synchronizing signal 30 to be generated. This process is repeated for each of the first 16 pulses of the 1st cycle of the multipulse synchronizing signal 30. For example, delay circuit No. 16 generates a pulse 72 after the expiration of delay interval No. 16 indicating that the number specifying the width of the sixteenth pulse of the 1st cycle of the synchronizing signal is to be read from the memory to generate a pulse 74 having a width identical to the width of the sixteenth pulse of the 1st cycle of the synchronizing signal 30. Pulses 66, 70 and 74 respectively comprise the first, second and sixteenth pulses of the 1st cycle of the delayed synchronizing signal 65. The pulses comprising each cycle of the delayed synchronizing signal 65 are identified by sequential numbers ranging from "1" to "16" to be consistent with the numbering scheme used to identify the pulses of the synchronizing signal 30 and to indicate that each pulse of the synchronizing signal 30 results in the production of a corresponding pulse of the delayed synchronizing signal 65. The 2nd and subsequent cycles of the simulator are identical with the 1st cycle discussed above because the 1st cycle is a typical cycle which is fully illustrative of the operation of the target signal simulator.

From the above discussion it should be noted that the delay interval initiated by each pulse of the synchronizing signal 30 is independently determined by the instantaneous value of the delay select signal at the time the corresponding pulse of the synchronizing signal 30 is detected by the delay select circuit 32. The value of the delay select signal from the target range calculator 40 is also independent of the duty cycle or PRF of the synchronizing signal 30. It should also be noted that the delay interval associated with any particular pulse is representative of the range of the simulated target and that this range changes continually based on the acceleration, initial velocity and initial range. Additionally, the simulator automatically tracks changes in the duty cycle or the PRF of the synchronizing signal.

The operation of the first cycle of the signal simulator, as discussed above, is repeated for the 2nd and subsequent cycles of the synchronizing signal 30. In FIG. 2 pulses corresponding to the first portion of the 2nd cycle of the synchronizing signal 30 are identified with the same reference numbers used to identify similar pulses for the first cycle followed by a letter "a." Since the operation for the second and subsequent cycles of the synchronizing signal 30 is identical to the first cycle, no detailed description will be given of subsequent cycles in order to simplify this application.

The signal simulator is intended for use with doppler radars. Additionally, as the range of the simulated target increases, the amplitude of the simulated target signal decreases. This being the case, the target range calculator 40 produces an amplitude select signal and a doppler select signal. The amplitude and doppler select signals are coupled as control signals to a signal synthesizer 75 to generate at the output terminal thereof an RF signal having an amplitude and a frequency respectively dependent on the range and velocity of the simulated target.

The frequency shift due to doppler is a direct function of the velocity of the simulated target. The attenuation of the amplitude is inversely proportional to the fourth power of the range of the target. The amplitude and doppler select signals can be scaled in accordance with these mathematical relationships using conventional circuit techniques. For example, digital numbers representing the range of the simulated target can be used as addresses to read digital numbers from a memory with the digital numbers scaled to specify the proper frequency and signal amplitude.

The delayed synchronizing signal 65 (FIG. 2) and the RF output signal from the signal synthesizer 75 are coupled as input signals to a signal generator 76. In response to these signals, signal generator 76 generates as an output a simulated target signal having the proper PRF, duty cycle, amplitude, and frequency to simulate the expected return signal from a target at the selected range. This permits the receiver and data processing circuits of the radar system to be completely tested using simulated target signals. Suitable signal synthesizers are commercially available.

Figure 3:
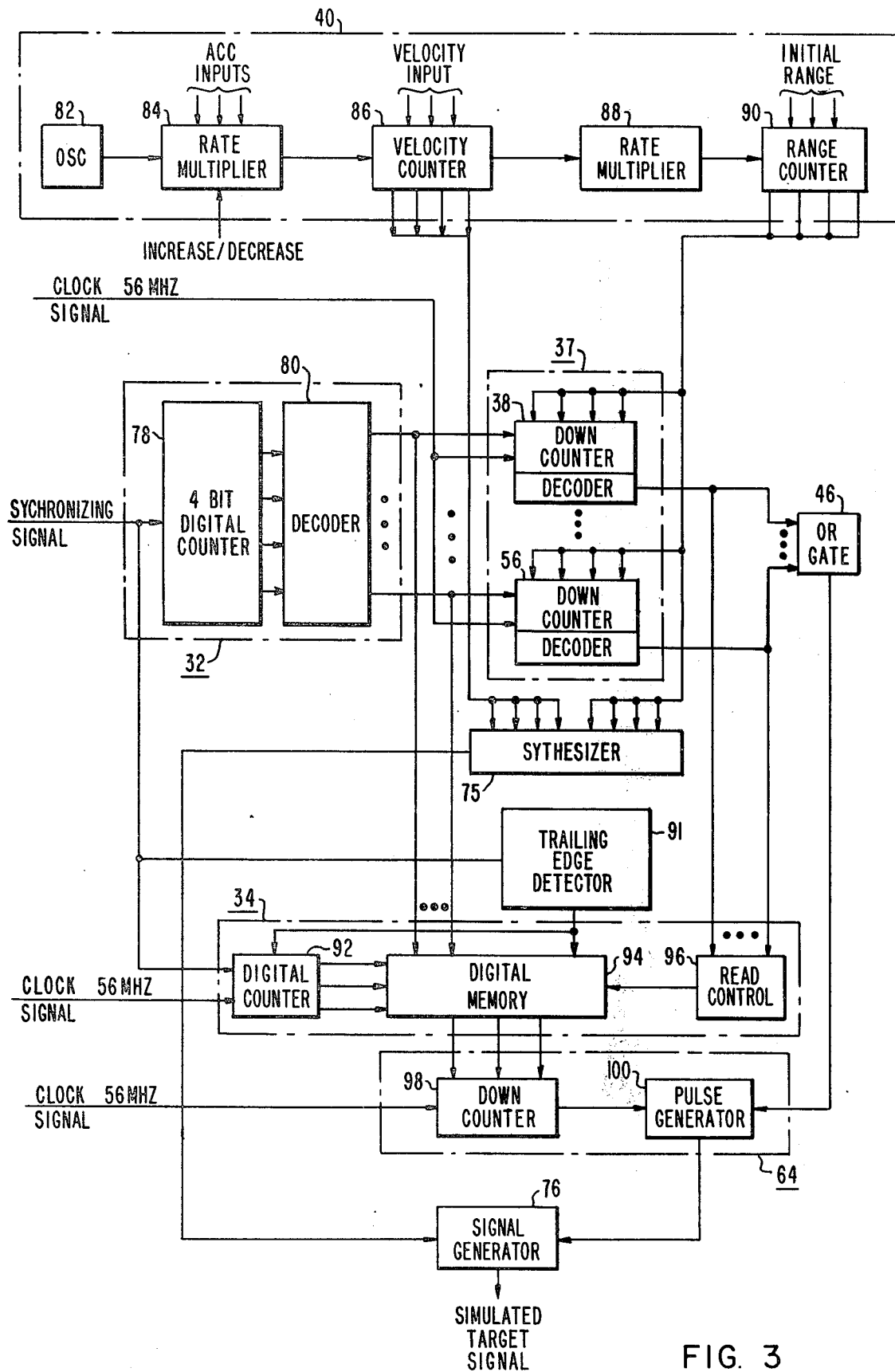
FIG. 3 is a more detailed block diagram of the target signal simulator.

FIG. 3 is a more detailed block diagram of the target signal simulator. The delay select circuit 32 includes a four-bit digital counter 78 which is stepped by the pulses of the synchronizing signal 30 to generate sequential digital numbers ranging in value from "zero" to "fifteen." The output of the four-bit counter 78 is coupled to a conventional binary decoder 80 to generate the 16 discrete signals which initiate the delay circuits No. 1 through No. 16. Two typical delay circuits are illustrated at reference numerals 38 and 56.

The delay circuits No. 1 through No. 16 may be conventional preset digital down counters which are preset to a value specified by the delay select signal. These counters are stepped by a high speed clock signal. The number stored in the down counter is decoded to generate an output pulse when the desired delay interval has expired as indicated by the count stored in the counter reaching zero. The resolution of delay circuits utilizing down counters is limited by the frequency of the clock signal used to step the counters. Clock signals in the range of a few MHz for example in the range of 14 MHz, are usable.

The target range calculator 40 includes an oscillator 82 which generates a digital clock signal. The output signal of the oscillator 82 and a digital signal specifying magnitude of the acceleration and an increase/decrease signal are coupled as inputs to a binary rate multiplier 84. The binary rate multiplier 84 generates a pulse train whose frequency is the product of the frequency of the oscillator 82 and the acceleration input signal. The oscillator 82 and the rate multiplier 84 may be well known conventional circuits. Therefore, no detailed design is illustrated.

The output signal of binary rate multiplier 84 and the velocity input signal are coupled to a velocity counter 86. This generates at the output of velocity counter 86 a digital number which specifies the instantaneous velocity of the target to be simulated. In generating the velocity signal it is assumed that the velocity is initially positive. This means that initially the range of the simulated target is either constant or increasing. The output signal of the acceleration binary rate multiplier 84 either increments or decrements velocity counter 86 depending on the status of the increase/decrease signal to rate multiplier 84. The increase/decrease signal is a two valued digital signal. The first value (corresponding to an increase status) indicates that the velocity counter 86 is to be incremented. Similarly, the second value (corresponding to a decrease status) indicates that the velocity counter 86 is to be decremented. If the velocity counter 86 is decremented through "zero," the velocity will become negative indicating that the range of the simulated target is decreasing. Similarly, a count of "zero" and a "positive count" in velocity counter 86 respectively indicate that the range is constant and increasing. The output signal of velocity counter 86 is coupled as inputs to a second rate multiplier 88. The output of the rate multiplier 88 is coupled to the input of range counter 90. The velocity counter 86 may be a conventional up/down counter. Similarly, rate multiplier 88 may be a conventional design.

A range counter 90 receives as inputs the output of binary rate multiplier 88 and the initial range of the target to be simulated. This generates at the output of the range counter 90 a signal which specifies the instantaneous range of the target to be simulated. The number stored in the range counter 90 may remain constant, increase or decrease as determined by the output signal of the velocity rate multiplier 88. The output signal of the range counter 90 is coupled to the pulse delay circuits No. 1 through No. 16 to preset these circuits to the delay intervals No. 1 through No. 16 as previously described. Range counter 90 and the velocity rate multiplier 88 may be of conventional design.

The output signal of the velocity counter 86 and the output signal of range counter 90 are coupled as inputs to the synthesizer 75 to select the frequency and the amplitude of the RF signal generated, as previously discussed. The synthesizer 75 may be model 35-05 manufactured by Real Time Systems.

The pulse width measuring circuit 34 includes a digital counter 92 which is reset to zero and is initialized to enable counting by the rising edge of each pulse of the synchronizing signal 30 (FIG. 2). Once initialized this counter counts the pulses of a 56 MHz clock signal so long as the initializing pulse of the synchronizing signal 30 is high. The trailing edge of each pulse of the synchronizing signal 30 is detected by a trailing edge detector 91 causing the digital counter 92 to stop counting and the digital number stored in the digital counter 92 to be stored in a digital memory 94 at an address location determined by the output signal of the decoder 80. For example, when the output signal of the decoder 80 indicates the first pulse of the first cycle of the synchronizing signal 30 is available, the digital number stored in digital counter 92 is stored in memory 94 at the first address location. This sequence is sequentially repeated to store sixteen digital numbers at sixteen sequential address locations. Trailing edge detector 91, digital counter 92 and the digital memory 94 may be of conventional design.

The output pulses of the delay circuits No. 1 through No. 16 defining the termination of delay intervals No. 1 through No. 16 are also coupled as inputs to a read control circuit 96. In response to the output pulses of the pulse delay circuits No. 1 through No. 16, the read control circuit 96 causes the digital number stored at addresses one to sixteen to be sequentially read from the digital memory 94. For example, pulse 44 (FIG. 2) which is the pulse output signal of delay circuit No. 1 is coupled to read control circuit 96, causing the digital stored at the first address location to be read. The output signals of delay circuits No. 2 through No. 16 similarly initiate the reading of the digital numbers stored at address locations 2 through 16. When reading of the digital number stored at address location 16 is complete, the cycle is repeated beginning with address location one.

The digital numbers read from the digital memory 94 are coupled as preset signals to a digital down counter 98 which is a portion of the pulse generator 64. Each of these values causes the digital down counter 98 to be preset to a value representing the pulse width of the corresponding pulse of the synchronizing signal 30. Following presetting, the down counter 98 is stepped by the pulses of a 56 MHz clock signal until the contents of the down counter 98 equals zero. The period during which the down counter 98 is being stepped is a time interval equal to the width of the corresponding pulse of the synchronizing signal 30. For example, the contents of the first memory location is a digital number specifying the number of cycles of the 56 MHz clock signal during the time when the first pulse of the synchronizing signal 30 was high, as determined by digital counter 92. The first pulse of the synchronizing signal 30 also resulted in the initiation of delay circuit No. 1. The output pulse of delay circuit No. 1 initiated the reading of this value to preset the down counter 98. Since the down counter 98 must count the same number of cycles of the fifty six MHz clock signal to reach zero as digital counter 92 counted to reach the stored value, the counting interval of the down counter 98 must correspond to the width of the first pulse of the synchronizing signal 30. This process is repeated to read all sixteen memory locations and then repeated beginning with the first memory location. When the words stored in all sixteen memory locations have been read, a cycle of the target signal simulator is complete. The subsequent cycles of the target simulator are identical and are not described in detail.

A signal defining the counting intervals of the down counter 98 and the output pulses generated by delay circuits No. 1 through No. 16, available at the output of the OR gate 46, are coupled to a pulse generator 100 to generate at the output thereof the delayed synchronizing signal 65. The delayed synchronizing signal 65 and the output signal of the synthesizer 75 are coupled as inputs to the signal generator 76 to generate at the output thereof the simulated target signal.

Signal generator 76 is basically a pulse width modulator which combines the delayed synchronizing signal 65 with the output signal of the synthesizer 75 to produce a pulse width modulated RF signal. Frequency translation circuits may also be included if the frequency range of the synthesizer 75 is not compatible with the frequency requirements of the radar system to be tested. These features are dependent on the application and can be implemented using available apparatus and conventional circuit techniques.

The target signal simulator discussed above included sixteen delay circuits (collectively illustrated at reference numeral 37, FIG. 3). It is obvious that the PRF and maximum range of the simulated target signal must be selected such that delay interval No. 1 has terminated before the seventeenth pulse (identified as the first pulse of the second cycle) of the synchronizing signal 30 occurs. This determines the maximum range of the simulated target for a given PRF. It is also obvious that the PRF and the maximum range of the simulated target signal can be increased by increasing the number of delay circuits. Increasing the number of delay circuits also requires a corresponding increase in the storage locations provided by memory 94.

I claim:

1. A signal simulator for generating a simulated target signal for testing a radar system, comprising in combination:
   (a) delay means for accepting a pulsed synchronizing signal and detecting the individual pulses thereof to sequentially initiate a plurality of delay circuits, each of said delay circuits generating an output pulse defining the termination of a delay interval corresponding to the range of a simulated target at the time the delay circuit was initiated;
   (b) means for detecting and measuring the duration of each individual pulse of said synchronizing signal to generate a plurality of digital numbers each representative of the duration of an individual pulse of said synchronizing signal;
   (c) means for storing said plurality of digital numbers;
   (d) means responsive to said output pulse of each of said plurality of delay circuits to sequentially read said stored digital numbers; and
   (e) means responsive to said output pulses of each of said delay circuits and to said digital numbers to generate said simulated target signal, said simulated target signal comprising pulses of RF energy, said simulated target having substantially the same pulse repetition frequency and duty cycle as said synchronizing signal but delayed therefrom by the range of said simulated target.

2. A signal simulator for generating a simulated target signal in accordance with claim 1 wherein:
   (a) said plurality of delay circuits includes a plurality of digital down counter circuits which are preset to preselected values and decremented by a clock signal and, a plurality of decoders which decode the contents of said plurality of digital down counters to generate a pulsed signal with each pulse of said pulsed signal corresponding to a digital number equal to zero stored in the associated digital counter.

3. A signal simulator for generating a simulated target signal in accordance with claim 2 wherein said means for detecting and measuring the duration of each individual pulse of said synchronizing signal includes a digital counter which is preset to "zero" and is enabled to begin counting the pulses of a clock signal by the leading edge of each pulse of said synchronizing signal, and is inhibited from counting by the trailing edge of each pulse of said synchronizing signal thereby sequentially generating a plurality of digital numbers each representative of the width of a pulse of said synchronizing signal.

4. A signal simulator for generating a simulated target signal in accordance with claim 3 further including a second down counter which is preset to a value equal to each of said digital numbers as they are read from said storage means and decremented to zero by a clock signal to generate a plurality of time intervals with each of said time intervals corresponding to the width of a pulse of said synchronizing signal.

5. A signal simulator for generating a simulated target signal in accordance with claim 4 further including means responsive to said pulsed signal and said plurality of time intervals to generate a delayed synchronizing signal having a PRF and duty cycle substantially equal to the PRF and duty cycle of said synchronizing signal and delayed therefrom by a time interval corresponding to the range of a simulated target.

6. A signal simulator for generating a simulated target signal in accordance with claim 5 further including means responsive to an acceleration signal, a velocity signal and an initial range signal to produce a digital number indicative of said range of a simulated target.

7. A signal simulator for generating a simulated target signal for testing a radar system, comprising in combination:
 (a) delay means for accepting a pulsed synchronizing signal and detecting the individual pulses thereof to sequentially initiate a plurality of delay circuits, each of said delay circuits generating an output signal defining the termination of a delay interval corresponding to the range of a simulated target at the time the delay circuit was initiated;
 (b) means for detecting and measuring the duration of each individual pulse of said synchronizing signal to generate a first plurality of signals each representative of the duration of an individual pulse of said synchronizing signal;
 (c) means responsive to said output signal and to said first plurality of signals and in response thereto generating said simulated target signal, said simulated target signal comprising pulses or RF energy having substantially the same pulse repetition frequency and duty cycle as said synchronizing signal but delayed therefrom by the range of said simulated target.

* * * * *